Figure 1:
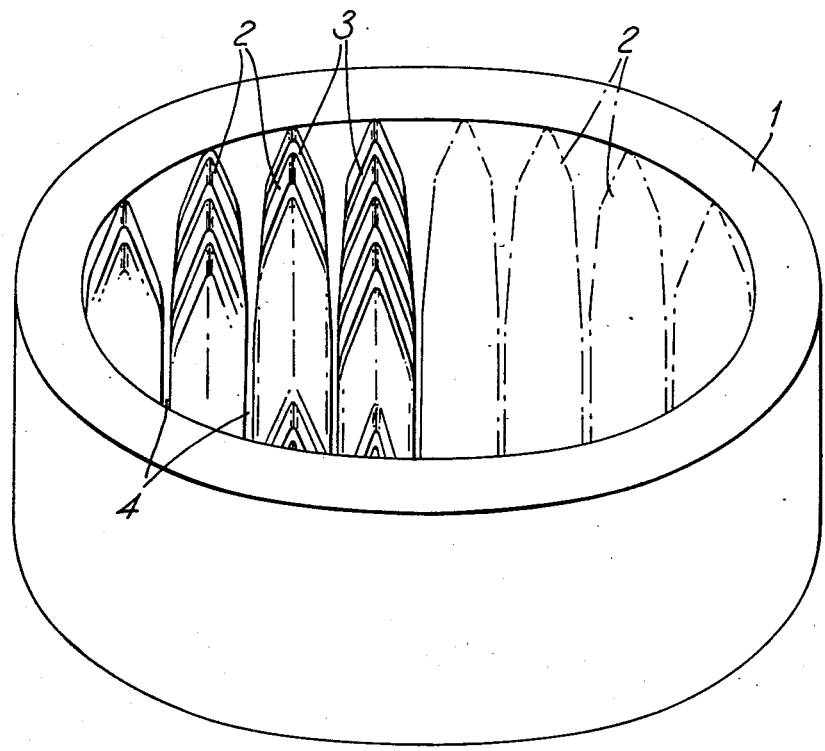

United States Patent [19]

Perelman

[11] 4,074,707

[45] Feb. 21, 1978

[54] MELT-SPINNING GRID

[75] Inventor: Arthur Perelman, Harrogate, England

[73] Assignee: Imperial Chemical Industries Limited, London, England

[21] Appl. No.: 664,736

[22] Filed: Mar. 8, 1976

[30] Foreign Application Priority Data

Mar. 13, 1975 United Kingdom ............... 10453/75

[51] Int. Cl.² ......................... D01D 1/04; F28D 21/00
[52] U.S. Cl. ........................... 126/343.5 A; 425/378 S
[58] Field of Search .............. 425/378 S; 126/343.5 A

[56] References Cited

U.S. PATENT DOCUMENTS 2,916,262  12/1959  Flores ........................... 126/343.5 A

FOREIGN PATENT DOCUMENTS 126,984  7/1959  U.S.S.R. ............................ 425/378 S

Primary Examiner—Robert D. Baldwin
Attorney, Agent, or Firm—Roderick B. Macleod

[57] ABSTRACT

A melt grid for the melting of particulate, solid polymer, comprising upper and lower faces between which runs at last one aperture of elongated cross-section bounded by at least one fin adapted for heating for melting polymer, the surface of the fin or fins bearing grooves running in the direction from the upper to the lower face of the grid.

3 Claims, 3 Drawing Figures

U.S. Patent    Feb. 21, 1978    Sheet 1 of 2    4,074,707

MELT-SPINNING GRID

The present invention relates to a melt grid for the melting of particulate, solid polymer.

According to the present invention we provide a melt grid for the melting of particulate, solid polymer, comprising upper and lower faces between which runs at least one aperture of elongated cross-section, the aperture, or apertures, each being bounded by at least one fin adapted to be heated so as to melt the polymer, and the surface of the, or each, fin bounding an aperture bearing grooves running in the direction from the upper to the lower face of the melt grid.

In the case wherein there is only one aperture in the melt grid, the aperture may be in spiral form in which case the fin or fins will be in spiral form. In the case wherein there is only one aperture and this is in zig-zag form, there will be a plurality of fins. It is also possible to have a single fin in zig-zag form with a plurality of apertures.

We prefer the melt grid to comprise a plurality of apertures and a plurality of fins.

The cross-section of an aperture should preferably decrease in the downwards direction. At the level of the minimum cross-section of an aperture the distance apart of its bounding walls should preferably not exceed that of the dimension of the particles to be melted. The minimum width of an aperture at the lower face of the grid is dictated by the corresponding pressure drop in the drainage of the molten polymer; an excessive pressure drop, resulting from excessively small width of aperture, will decrease the melt rate potential of the melting apparatus. We prefer the width of an aperture to be about 0.9 times the 10th percentile of the polymer particle size, as defined by its minor axis.

The grooves should preferably not be deeper than the dimension of the particles to be melted; they should also preferably not be wider than the dimension of the particles to be melted. The width of a groove should preferably not exceed about 0.9 times the 10th percentile of the polymer particle size, as defined by its minor axis. A groove should preferably be sized so that its impedance to the flow of melt is substantially lower than that along the film of melt between the fin-walls and the unmelted polymer particles. A groove should preferably be of width not less than 1 mm. and more preferably not less than 1.5 mm.

Preferably the grooves should take the shortest path between the upper and lower edges of a fin, but at least their course should preferably tend towards such a path as their course progresses towards the lower face. Each groove on a side of a fin should preferably follow a similar course and have a similar disposition with respect to the side of the fin so that sufficient number of grooves may be accommodated. Preferably a groove should have a uniform cross-section throughout its course. A groove may, for example, be of rectangular, trapezoidal, V-shaped or semi-circular cross-section.

A fin should preferably be narrower at the upper face of the grid, so that a relatively large number of particles of polymer to be melted should be accommodated within the compass of the grid, within the aperture, or apertures, and yet the smallest dimension of the aperture, or apertures, which will be at the lower part of the grid, will still be less than the smallest dimension of a particle of polymer. Preferably the cross-section of a fin should be of such a shape that the slope of a side tends towards the vertical in the direction towards the lower face of the grid. The steepness of the slope of a side of a fin in its upper part is dictated by two opposing considerations. The steeper the angle, the more powerful is the wedging action which magnifies the pressure between the chip bed and the fin-walls, and, hence, increases the melt-rate. On the other hand, when chips are melted at the side of the chip bed, an equal volume of chips has to move across to replace the "lost volume". A very steep slope, for example approaching the vertical, would make sideways movement very difficult. Thus the slope at the top of a side of a fin should not be too steep. We prefer the slope of a fin-wall at the top to be no more than 45° to the vertical, and more preferably to be between 20° and 30° to the vertical.

Heating of the fins to effect melting of the particles of polymer may, for example, be effected by providing a duct through the length of a fin adapted for the passage of liquid or vapour at an appropriate temperature. A fin may be heated by conduction from a member with which it is in contact and to which heat is supplied. A fin may be heated electrically, for example by the passage of an electrical current through it or through an electrically conductive element running through it. Preferably the heat should be supplied, or should be supplied with a greater heat transfer towards the upper face of the grid, so that melting of particles of polymer should at that location be subjected to the greatest melting effect, and yet the already melted polymer should not thereafter continue to receive heat, or should only receive heat at a relatively low rate.

The melt grid should preferably be fabricated from metal or alloy having no adverse chemical effect on the polymer, and having a high thermal conductivity. In the case wherein a fin is heated electrically by passage of a current through it, it is advantageously fabricated at least in part from electrically conductive material.

The melt grid according to the present invention may be used for the melting of any polymer commonly formed into shaped articles by melt extrusion. Examples of such polymers are polyesters, polyamides and polyolefines.

According to the present invention, we also provide an apparatus for the melt extrusion of particulate polymer comprising a melt grid, means for gravity feed of particulate polymer to the upper face of the melt grid, a melt pool for receiving molten polymer from the lower face of the melt grid and means for removing molten polymer from the melt pool and delivery to melt extrusion means, wherein the melt grid comprises at least one aperture of elongated cross-section running between the upper and lower faces, the aperture, or apertures, each being bounded by at least one fin adapted to be heated so as to melt the polymer, and the surface of the, or each, fin bounding an aperture bearing grooves running in the direction from the upper to the lower face of the melt grid.

Associated with the melt grid there may also be means for forcing the particles of polymer onto the upper face of the grid reinforcing the force of gravity with improvement of the rate of melting, provided that the availability of heat is appropriately improved.

According to the present invention we also provide a process for the melt extrusion of particulate polymer wherein polymer particles are fed to the upper receiving face of a melt grid to which heat is supplied, collecting molten polymer from the lower effluent face of the grid in a melt pool, removing molten polymer from the melt pool substantially at the rate at which it is collected and feeding it to extrusion means, wherein the melt grid comprises at least one aperture of elongated cross-section running between the upper and lower faces, the aperture, or apertures, each being bounded by at least one fin adapted to be heated so as to melt the polymer, and the surface of the, or each, fin bounding an aperture bearing grooves running in the direction from the upper to the lower face of the melt grid.

Figure 2:
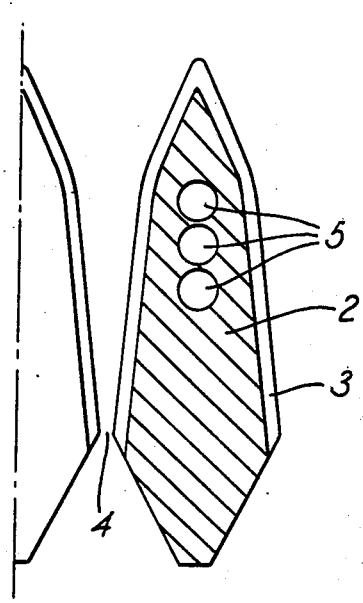
Figure 3:
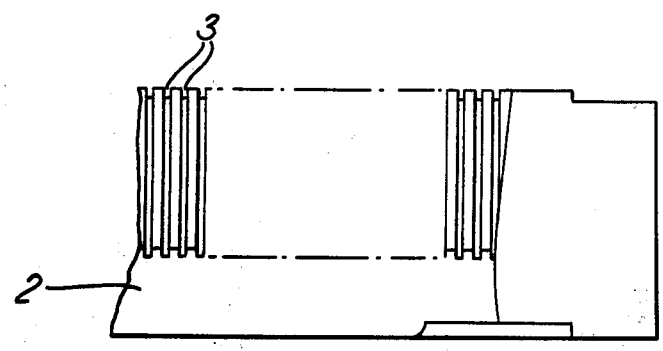

A specific embodiment of the present invention will now be described with particular reference to FIGS. 1, 2 and 3, in which FIG. 1 shows a melt grid according to the present invention, FIG. 2 shows a cross section of a fin of FIG. 1, FIG. 3 shows a side elevation of a fin of FIG. 1. Referring to FIGS. 1, 2 and 3, a melt grid comprises 8 parallel fins 2 equally spaced apart within a circular casing 1 of 241 mm. diameter. The casing 1 and fins 2 are of aluminium. The minimum separation between fins is 3 mm. 4. The grooves 3 of the fins 2 are of width 2.5 mm. at the mouth, tapering at an included angle of 10° to a flat bottom. Three parallelly disposed elongated apertures 5 each of uniform cross-section and of diameter 6 mm., extend throughout the length of each fin.

In operation, a liquid heating medium is pumped through apertures 5 providing heat for the melting of polymer particles in contact with the fins 2.

In use for extrusion, the grid was appropriately enclosed and provided with means for forcing polymer particles onto its upper surface, a melt pool for receiving the melted polymer and a pump for removing the molten polymer from the melt pool for extrusion. Using poly(ethylene terephthalate) of intrinsic viscosity (as measured at 25° C. in orthochlorophenol at a concentration of 1 g. of polyester per 100 ml. of solvent) of 0.65 to 0.66 dl. per g., the poly(ethylene terephthalate) was melted at a rate of 28 kg. per hour. The residual pressure in the molten polymer was measured below the melt grid.

Comparison was made with the use of a melt grid having no grooves in the fins but otherwise identical. The residual pressure in the molten polyester was measured. The comparative results were as follows:

| Grid temperature | 290° C. | 300° C. |
| --- | --- | --- |
| Ungrooved grid residual pressure | 50 psig. | 60 psig. |
| Grooved grid residual pressure | 120 psig. | 150 psig. |

I claim:
1. An improved melt grid for the melting of solid particulate polymer, which melt grid comprises a plurality of elongated aligned fins defining an upper receiving face and a lower effluent face connected by at least one first aperture of elongated cross-section, at least one second aperture longitudingly disposed within one of said fins intermediate the upper and lower faces providing a heat-receiving surface within the melt grid, wherein the improvement comprises said first aperture is formed by opposed sides of two fins with at least one of said sides bearing a plurality of grooves running in a direction from said upper receiving face to said lower effluent face, and wherein said grooves have a width of at least 1 mm.

2. A melt grid according to claim 1 comprising a plurality of first apertures.

3. A melt grid according to claim 1 wherein said cross-section of said first aperture decreases in the downwards direction.

* * * * *